United States Patent [19]

Dauvergne et al.

[11] Patent Number: 4,459,896
[45] Date of Patent: Jul. 17, 1984

[54] HYDRAULIC DISTRIBUTOR DEVICES

[75] Inventors: Jean L. R. Dauvergne, Fosses; Patrice Bertin, Paris, both of France

[73] Assignee: Valeo, Paris, France

[21] Appl. No.: 274,781

[22] Filed: Jun. 18, 1981

[30] Foreign Application Priority Data

Jun. 23, 1980 [FR] France .............................. 80 13841

[51] Int. Cl.³ .......................... F15B 9/10; B62D 5/08
[52] U.S. Cl. .................................... 91/375 A; 91/467; 137/625.21
[58] Field of Search ................. 91/375 R, 375 A, 467, 91/374; 137/625.21

[56] References Cited

U.S. PATENT DOCUMENTS

| 3,237,644 | 3/1966 | Beck et al. | 137/625.21 |
| 3,513,879 | 5/1970 | Adams | 91/375 R |
| 4,217,932 | 8/1980 | Bacardit | 91/375 R |
| 4,254,691 | 3/1981 | Dauvergne | 91/467 |

Primary Examiner—Robert E. Garrett
Assistant Examiner—Richard L. Klein
Attorney, Agent, or Firm—Young & Thompson

[57] ABSTRACT

A hydraulic distributor device comprises two members movable relative to one another, either in rotary or translational movement, along a planar sliding interface, at least one narrow groove being provided superficially in one of the members along the interface, so as to minimize or eliminate the axial thrust generated by the fluid pressure. The distributor device may be used in power-assisted steering apparatus for a vehicle.

4 Claims, 19 Drawing Figures

HYDRAULIC DISTRIBUTOR DEVICES

BACKGROUND OF THE INVENTION

The present invention relates to a hydraulic distributor device comprising two members movable relative to one another along a planar sliding interface, said members having passages for the circulation of fluid under pressure, which open onto said interface and being operable to communicate with one another or to be isolated from one another, depending on the relative position of said members. These members have a generally relative rotary or translational movement.

Fluid pressure often results in an imbalance of the stresses of hydraulic origin at the interface of the members, and a thrust perpendicular to the interface results from this. It has already been proposed to absorb such a thrust by means of bearings, but these increase the installation cost.

It is one object of the present invention to provide a means of balancing forces between two adjacent members having a relative movement, which is free of this disadvantage and which, by means of an especially simple and convenient arrangement, enables the thrust generated by the fluid pressure to be minimised or even eliminated.

SUMMARY

A hydraulic distributor device according to the invention comprises two adjacent members movable relative to one another along a planar sliding interface, said members having passages for the circulation of fluid under pressure, said passages opening on to said interface and being operable to communicate with one another or to be isolated from one another, depending on the relative position of said members, wherein at least one narrow groove is provided superficially in at least one of said members along said interface, so as to minimise or eliminate a thrust generated by the fluid pressure perpendicularly to said interface.

The effect of such a groove is to modify the pressure field along the interface of the members, and it thus makes it possible to modulate by construction the thrust perpendicular to the interface, which results from the pressure of the fluid, particularly in order to minimise or even eliminate this thrust, which then makes it possible to avoid the use of bearings or of any other palliative measures which increase the construction cost, and to reduce the wear of the members and to improve the operating flexibility.

The groove can have an open contour, either with two closed ends or with one end closed and the other end open into at least one of the passages, or with one end closed and the other end open to one of the outer and inner peripheries of the member having the groove, or with two ends open respectively to two of the passages, or else with two ends open respectively to one and/or the other of the outer and inner peripheries of the member having the groove. The groove can also have a closed contour which may or may not circumscribe one of the passages. Furthermore, the groove can possess one or more branches.

The invention also provides power-assisted steering apparatus for a vehicle, comprising pilot means and deflecting means, said pilot means being operable to act upon the deflecting means, said pilot means comprising a transmission element in two parts operable to move relative to one another with limited angular play permitting an angular stagger between said parts under the action of said pilot means, and assistance means which, in response to such an angular stagger, are allowed to act upon the deflecting means in the same direction as the pilot means, said assistance means comprising a hydraulic unit having fluid-pressure means and a tank, a hydraulic actuator acting upon said deflecting means, and a hydraulic distributor device disposed between the unit and the actuator, said distributor device comprising an axial stack consisting of a first stator, a first rotor disc rotating integrally with one of the two parts of the transmission element, at least one second rotor disc rotating integrally with the other part of the transmission element, and a second stator, the rotor discs and/or the stators having hydraulic passages for the feeding and return of fluid between the actuator and the unit, said groove being provided in at least one of said rotors and stators.

DESCRIPTION OF THE PREFERRED EMBODIMENTS

Reference will be made, first of all, to FIGS. 1 to 7 which relate, by way of non-limiting example, to an application of the balancing device according to the invention to a power-assisted steering unit of a motor vehicle.

The power-assisted steering unit comprises (FIG. 1) pilot means 10 acting upon deflecting means such as short rods 11. The pilot means 10 comprise a steering-wheel 12 and a steering column 13. The latter has two aligned parts 13A and 13B provided with a limited relative play permitting an angular stagger between the parts 13A and 13B under the action of the pilot means 10. The part 13A is integral with the steering-wheel 12, whilst the part 13B is integral with a pinion 14 which engages with a rack 15. The latter is operable to turn front wheels 16 of the vehicle via short deflecting rods 11.

A hydraulic assistance unit 17, 18 comprises a tank 17 and liquid-pressure means such as a pump 18 drawing from this tank 17. A hydraulic actuator 19 comprises, in the example illustrated, a jack having a piston 20 (FIG. 3), the rod 21 of which acts upon the rack 15. The piston 20 divides the actuator to define two chambers 22 and 23 therein.

A hydraulic distributor 24 is inserted between the pump 18 and the actuator 19 and is sensitive to the angular stagger of the two parts 13A and 13B, so as to cause the actuator 19 to act upon the short deflecting rods 11 in the same direction as the pilot means.

The distributor 24 comprises an axial stack (FIGS. 2 and 3) consisting of a first stator 25, a first rotor disc 26 rotationally fast with the part 13A of the steering column, a second rotor disc 27 rotationally fast with the part 13B of the steering column, and a second stator 28.

Figure 1:
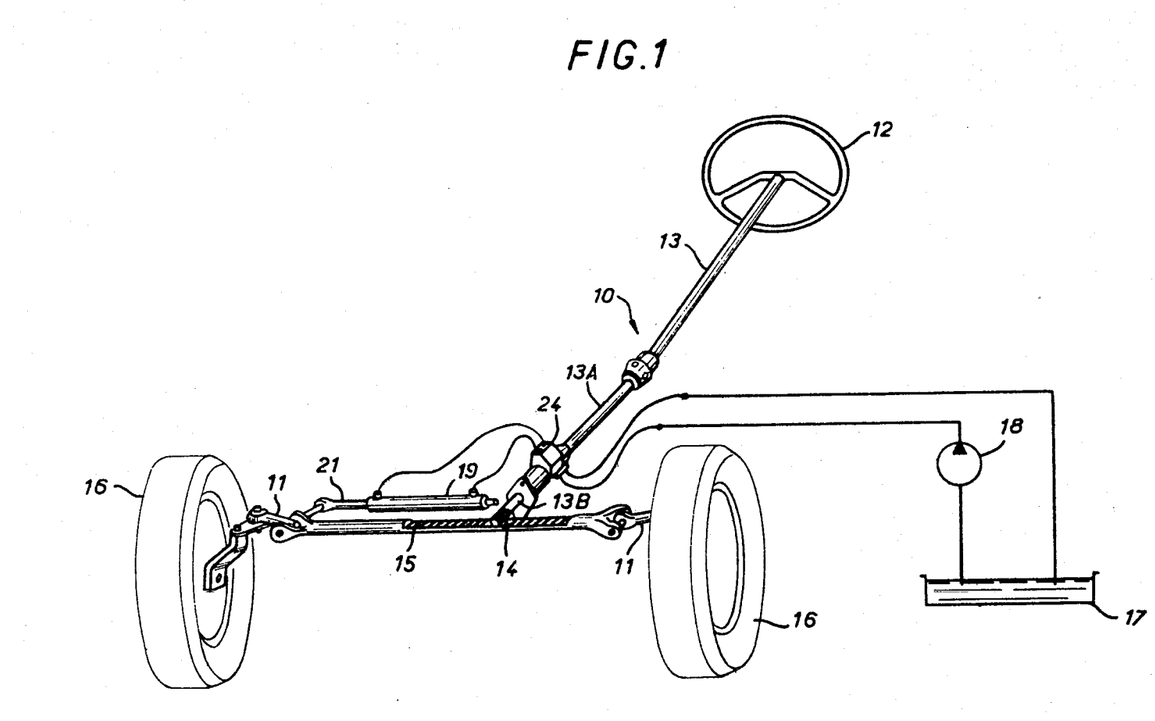
FIG. 1 is a diagrammatic perspective view of power-assisted steering apparatus for a motor vehicle, comprising a hydraulic distributor device according to the invention.
Figure 2:
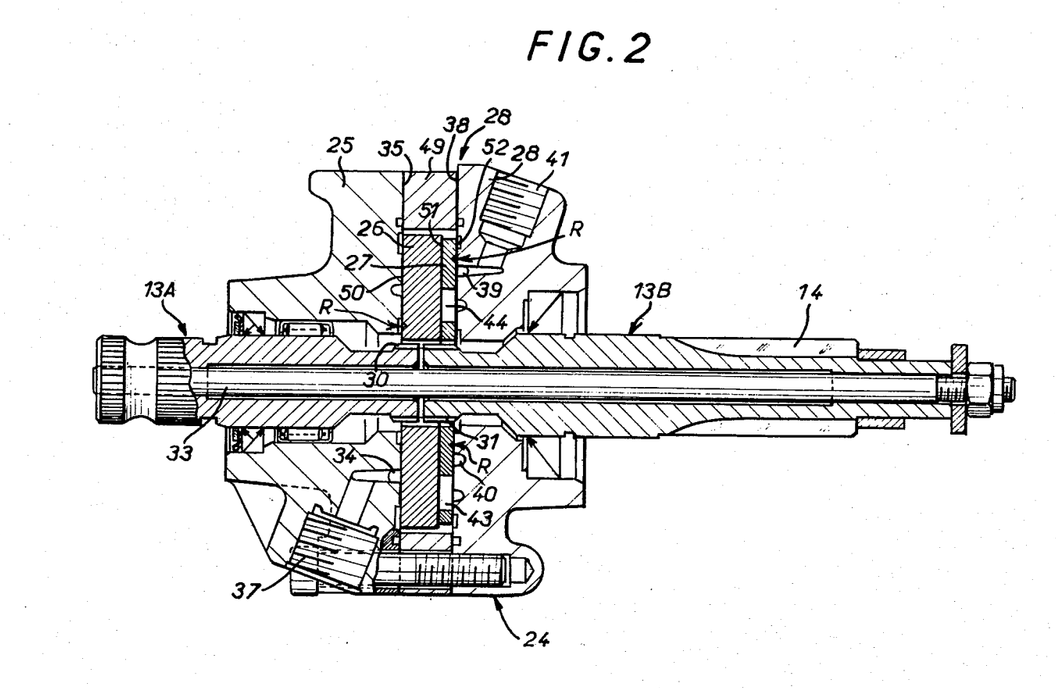
FIG. 2 is a view on a larger scale of the distributor, in a longitudinal section.
Figure 3:
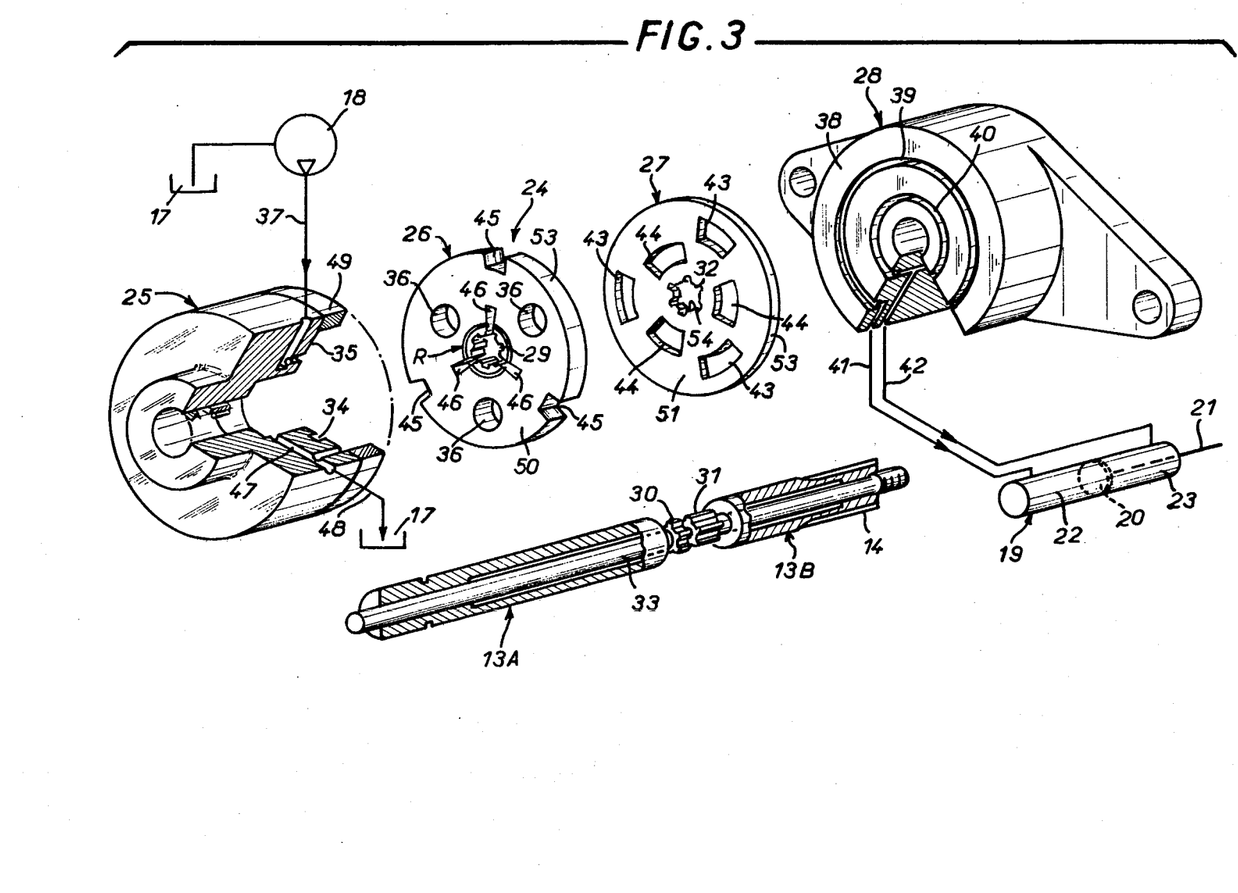
FIG. 3 is an exploded diagrammatic view in perspective, showing the stators and the rotors of the distributor, and part of the steering column.
Figure 4:
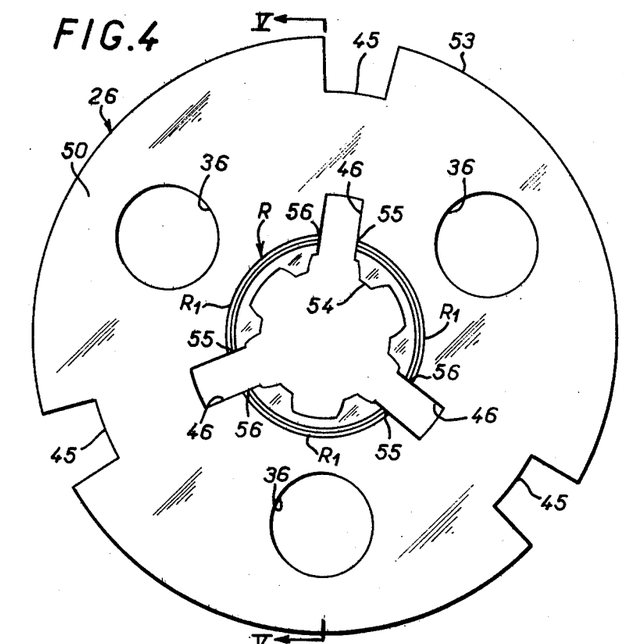
FIG. 4 is a view on a larger scale of the face of the first rotor adjacent to the first stator, and shows in detail a balancing groove.
Figure 5:
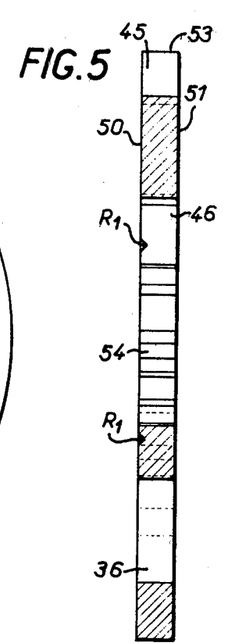
FIG. 5 is a corresponding view of the first rotor, in a longitudinal section along the line V—V of FIG. 4.

The first disc 26 is thicker than the second disc 27. It has a fluted central aperture 29 engaged without angular play on a toothed bearing 30 of the part 13A and engaged with angular play on a toothed bearing 31 of the part 13B. The said second disc 27 has a fluted central aperture 32 engaged without play on the toothed bearing 31 of the part 13B.

It is the play between the teeth on bearing 30 and those on bearing 31 which defines the limited relative angular play between parts 13A and 13B mentioned above. This play is a few degrees on either side of a middle neutral position which tends to be restored and maintained by a torsion bar 33 coupling the parts 13A and 13B elastically.

An annular groove 34 is made on the face 35 of the stator 25 adjacent to the disc 26. This disc 26 has a circularly arranged series of cylindrical passages 36 (three in the example illustrated) which are disposed at substantially the same mean radius as the groove 34 so as to overlap the latter and which extend from one face of the disc 26 to the other. This annular groove 34 is connected to the pump 18 via a conduit 37.

The face 38 of the second stator 28 adjacent to the second disc 27 has two concentric annular grooves 39 and 40 which are connected respectively via conduits 41 and 42 to the two chambers 22 and 23 of the actuator 19. The second disc 27 has two circularly arranged series of passages 43 and 44 respectively.

The passages 43 of the first series (three in the example illustrated) are disposed at substantially the same mean radius as the groove 39 so as to overlap the latter, and extend from one face of the disc 27 to the other, whilst the passages 44 of the second series (three in the example illustrated) are disposed at substantially the same mean radius as the groove 40 so as to overlap the latter and extend from one face of the disc 27 to the other.

The first disc 26 has a series of outer peripheral notches 45 and a series of inner peripheral notches 46. These notches 45 and 46 are intended to permit return of hydraulic fluid to the tank 17 via a passage 47 in the stator 25 and a conduit 48. In FIGS. 2 and 3 there is shown an annular stay 49 connecting the stators 25 and 28 and surrounding the rotors 26 and 27.

The distributor 24 which has just been described therefore comprises four adjacent members 25, 26, 27 and 28 respectively, which have a relative rotary movement and are separated from one another by planar interfaces 50, 51 and 52 respectively, perpendicular to the axis of rotation. These members have fluid-circulation passages 34, 36, 45, 46, 43, 44, 39 and 40, some of which are under pressure, whilst others serve for the return to the tank. Various passages open on to the interfaces 50, 51 and 52 and are designed to communicate wholly or partly with one another or to be isolated from one another, depending on the relative angular position of the members 25, 26, 27 and 28.

According to the invention, at least one narrow groove R is provided superficially in at least one of the members 25, 26, 27 and 28 along the interface 50, 51 or 52, so as to minimise or even cancel the axial thrust generated by the fluid pressure which occurs in the occluded regions.

To give a better idea, the said narrow groove R has, for example, a width of the order of one millimeter and a depth of the order of half a millimeter.

Such a groove R can have an open contour i.e. not a closed loop, with either one end closed and the other open into at least one of the passages, or with one end closed and the other open to one of the outer 53 and inner 54 peripheries of the member 25, 26, 27 or 28 having the groove R, or with the two ends open respectively to two of the passages 34, 36, 45, 46, 43, 44, 39 and 40, or else with the two ends open respectively to one and/or the other of the outer 53 and inner 54 peripheries of the member 25, 26, 27 or 28 having the groove R. This groove R can also have a closed contour and may or may not surround one of the passages 34, 36, 45, 46, 43, 44, 39 and 40.

In the example illustrated in FIGS. 1 to 7 (see more particularly FIGS. 4 and 5), a groove R, designated by $R_1$, is made in the first rotor disc 26 along its face adjacent to the stator 25, that is to say along the interface 50. This groove $R_1$ comprises three portions each with an open contour. The two ends 55 and 56 of each portion open respectively into two notches 46. The three portions together constitute the groove $R_1$ to give it a generally circular form coaxial with the disc 26. The groove $R_1$ has an essentially triangular cross-section with a width of the order of one millimeter and a depth of the order of half a millimeter. The effect of the groove $R_1$ is to modify the field of distribution of the pressures between the rotor 26 and the stator 25 in a way which tends to minimise the axial thrust on the distributor 24.

In the embodiment illustrated by way of example in FIGS. 1 to 7, a groove R is also provided in the other rotor disc 27 along the face of the latter which is adjacent to the stator 28, that is to say along the interface 52.

More particularly (FIGS. 6 and 7), the groove R of the rotor disc 27 consists of two sets of grooves $R_2$ and $R_3$. The groove $R_2$ has a closed contour and is connected to branches 57 which are open at 58 to the inner periphery 54 of the disc 27. The groove $R_2$ can instead be considered as comprising three grooves of open contour joined together, the ends of which three grooves are open to the inner periphery 54. Each groove $R_3$ has an open contour and its two ends 59 and 60 are open respectively to the outer periphery 53 of the rotor disc 27.

Figures 6, 7:
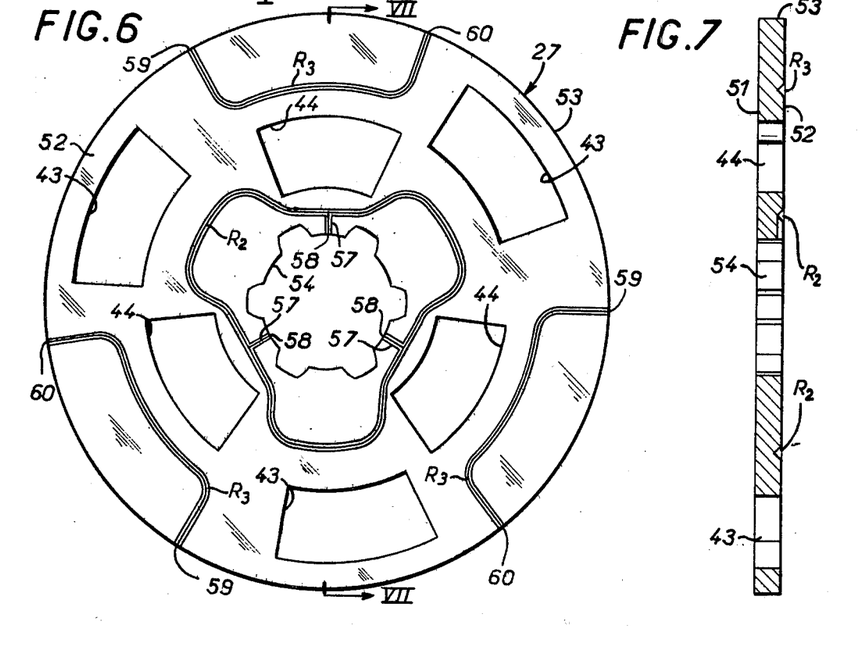
FIG. 6 is a view analogous to FIG. 4, but showing the face of the second rotor adjacent to the second stator, and shows, also in detail, balancing grooves.
FIG. 7 is a corresponding view of the second rotor, in a longitudinal section along the line VII—VII of FIG. 6.

In the same way as the groove $R_1$ of the rotor 26, these grooves $R_2$ and $R_3$ of the rotor 27 tend to minimise the axial thrust on the distributor 24.

In the absence of any action by the driver on the steering wheel 12, the parts 13A and 13B are maintained in a neutral position by means of the torsion bar 33. Delivery of fluid by the pump 18 to the groove 34 is via the conduit 37 and reaches the passages 36, whatever the angular position of the rotor disc 26, and from there reaches the passages 43 and 44 which are themselves connected to the notches 45 and 46 for return to the tank 17 via the passage 47 and the conduit 48. Therefore, the pressure of the pump has no effect on the two chambers 22 and 23 of the actuator 19. Thus, the unit functions with an open centre and the actuator 19 is not pressurised.

When the driver turns the steering wheel 12 to deflect the wheels 16, the parts 13A and 13B are staggered relative to one another in a direction depending on the direction in which the steering wheel 12 has been turned, and the relative angular position of the two discs 26 and 27 changes from the neutral position to a working position, in which the passages 43 overlap a greater area of the passages 36, but have a reduced overlap in relation to the notches 45, whilst the passages 44 have a reduced overlap in relation to the passages 36 and overlap the notches 46 to a greater extent.

Under these conditions, pressurised fluid is delivered by the pump through the groove 34 into the passages 36 and thence is preferentially allowed to pass via the passages 43 into the groove 39 and, from there, into the chamber 22 of the actuator 19. This chamber increases in volume as the rod 21 is pushed in the desired direction of deflection. The chamber 23 of the actuator 19 is reduced in volume and its fluid is forced via the conduit 42 into the groove 40 and into the passages 44 which communicate with the slots 46 for return to the tank 17 via the passage 47 and the conduit 48.

When the driver turns the steering wheel 12 in the other direction, the operation is the same as that just described, but the disc 27 assumes an angular position relative to the disc 26 which is staggered in the other direction relative to the neutral position. Fluid is delivered by the pump through passages 34, 36, 44, 40 and 42 into the chamber 23 of the actuator 19, and the return of liquid from the chamber 22 to the tank 17 is effected via 41, 39, 43, 45, 47 and 48.

In case of failure of the assistance means, the effect of turning the steering wheel 12 is to take up the limited relative angular play between the parts 13A and 13B in the sets of teeth 29, 30, 31 and 32, by overcoming the elastic resistance provided by the torsion bar 33, and subsequently, by means of the rigid connection effected by the thick disc 26 which straddles the sets of teeth 30 and 31, to cause the part 13B to rotate with the part 13A, which effects the deflection.

The simple and effective construction, with a balanced operation, due to the grooves $R_1$, $R_2$ and $R_3$ of the arrangement described, will be appreciated more particularly by reference to FIGS. 1 to 7.

Figure 8:
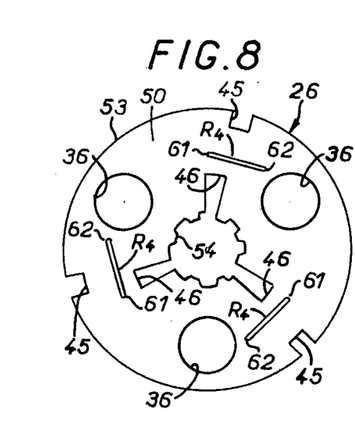
FIGS. 8, 9, 10, 11, 12, 13, 14 and 15 are views analogous to FIG. 4 or to FIG. 6, but relate to various alternatives of grooves applied either to the first rotor or to the second rotor.
Figure 9:
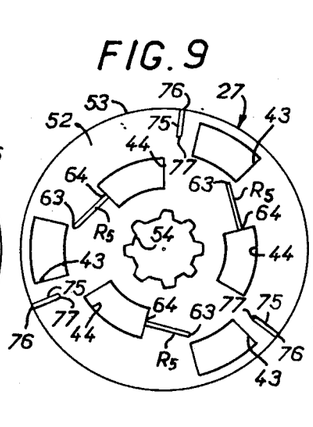

Reference will now be made to FIGS. 8 and 9 which relate to alternative configurations of grooves R applied respectively to the rotor 26 and to the rotor 27. A groove R (FIG. 8) is made on the rotor 26 along the interface 50 and comprises three grooves $R_4$. Each groove $R_4$ has an open contour and its two ends 61 and 62 are closed. A groove R is also provided on the rotor 27 (FIG. 9) along the interface 52. This groove R comprises three grooves $R_5$. Each groove $R_5$ has an open contour and has one end 63 closed, whilst the other end 64 is open into a passage 44. Furthermore, grooves 75 having an open contour and closed at one end 77 are provided in the vicinity of the outer periphery 53 of the disc 27 and open at 76 on to this periphery 53.

It should be noted that grooves having an open contour and closed at one end, such as the grooves 75, can be provided with their other end opening on to the inner periphery 54.

Figure 10:
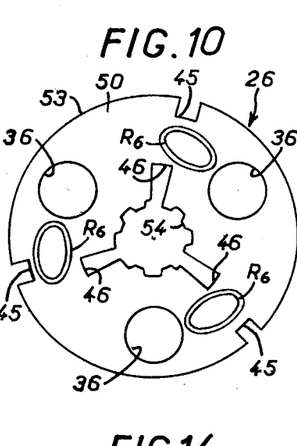
Figure 11:
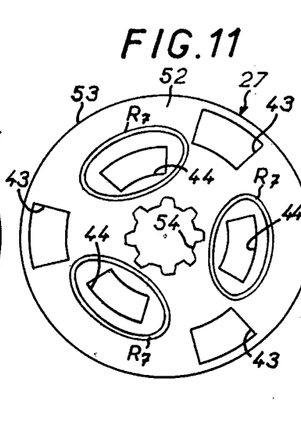

Reference will now be made to FIGS. 10 and 11 which relate to further alternative grooves R applied respectively to the rotor 26 and to the rotor 27. A groove R (FIG. 10) is made on the rotor 26 along the interface 50 and consists of three grooves $R_6$. Each groove $R_6$ has a closed contour and does not circumscribe a passage 36. A groove R is also provided on the rotor 27 (FIG. 11) along the interface 52. This groove R comprises three grooves $R_7$. Each groove $R_7$ has a closed contour and circumscribes a passage 44.

Figure 12:
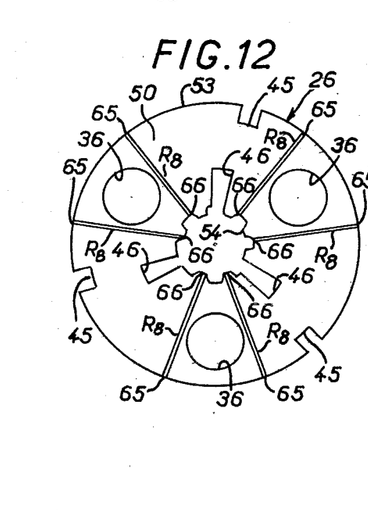
Figure 13:
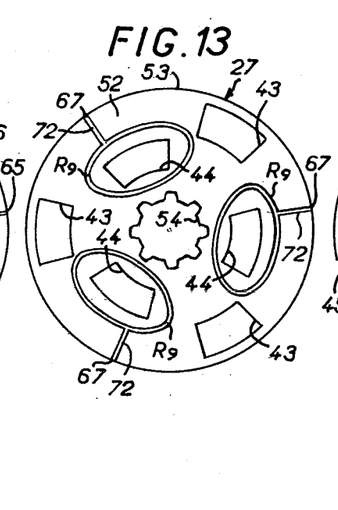

Reference will now be made to FIGS. 12 and 13 which relate to yet further alternative grooves R applied respectively to the rotor 26 and to the rotor 27. A groove R (FIG. 12) is made on the rotor 26 along the interface 50 and consists of six grooves $R_8$. Each groove $R_8$ has an open contour and its two ends 65 and 66 are open respectively to the outer periphery 53 and to the inner periphery 54 of the disc 26. A groove R is also provided on the rotor 27 (FIG. 13) along the interface 52. This groove R comprises three grooves $R_9$. Each groove $R_9$ circumscribes the passage 44 and has a branch 72 which opens at 67 on to the outer periphery 53 of the rotor 27.

Figure 14:
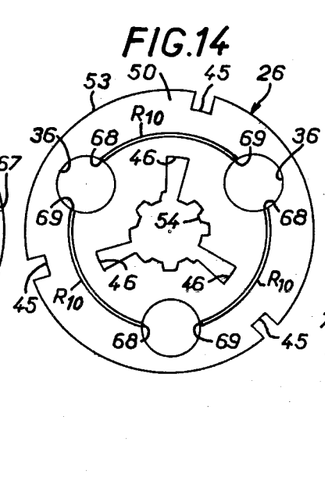
Figure 15:
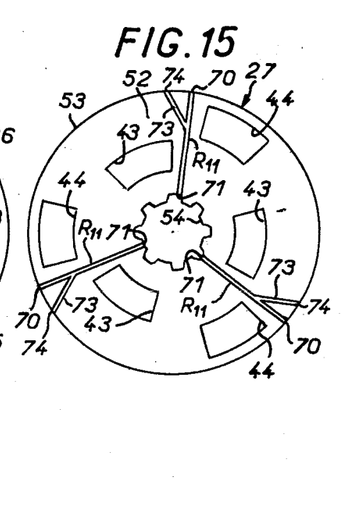

Reference will now be made to FIGS. 14 and 15 which relate to other alternative grooves R applied respectively to the rotor 26 and to the rotor 27. A groove R (FIG. 14) is made on the rotor 26 along the interface 50 and consists of three grooves $R_{10}$. Each groove $R_{10}$ has an open contour and its two ends 68 and 69 are open respectively to two of the passages 36. A groove R is also provided on the rotor 27 (FIG. 15) along the interface 52. This groove R comprises three grooves $R_{11}$. Each groove $R_{11}$ has an open contour with two ends 70 and 71 open respectively to the outer periphery 53 and to the inner periphery 54 of the disc 27. The groove $R_{11}$ has a branch 73 which opens at 74 on to the outer periphery 53 of the disc 27.

It should be noted that a branch such as the branch 73 can be provided in association with any shape of groove, for example a groove with two closed ends such as the groove $R_4$ of FIG. 8.

In the foregoing, the balancing device has been described as having, by way of example, the grooves in the face of a rotor adjacent to a stator, but, within the scope of the invention, the grooves can also be made in the face of a rotor adjacent to the other rotor, or else in a stator. Likewise, the grooves can be made either in one of the rotors and stators or in two or more of these. It will also be appreciated that all or part of the various illustrated embodiments of the grooves in one of the rotors can be used for the other rotor or adapted to the stators.

Moreover, it should be noted that the invention applies not only to the balancing of two hydraulic members having a relative rotary movement about an axis perpendicular to their planar interface such as the interface 50, 51, or 52, but also to the balancing of two members which are, in general terms, movable relative to one another along a planar sliding interface, and, for example, two members having a relative translational movement parallel to this interface.

Reference will now be made to FIGS. 16 to 19 which relate, by way of non-limiting example, to such an application of the invention to a hydraulic distributor having a body 80 with two operation orifices 81, 82, a pressure orifice 83 and a return orifice 84 and receiving two flat slide valves 85 and 86. The slide valve 85 has passages 87 and the slide valve 86 has passages 88.

Figure 16:
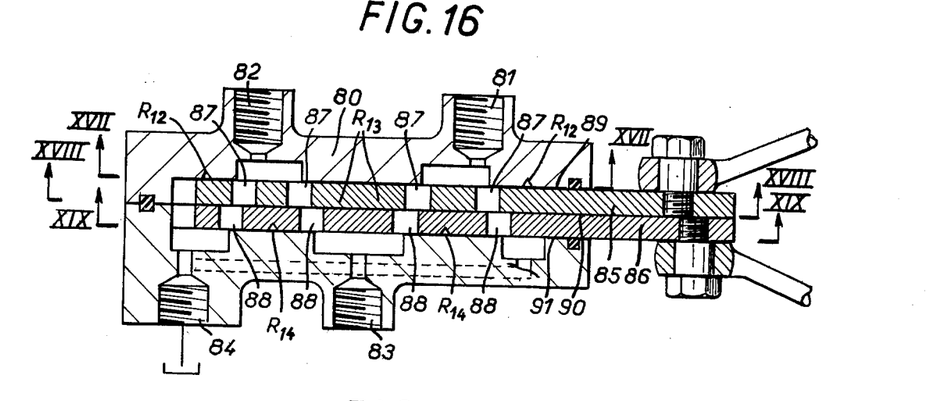
FIG. 16 shows in longitudinal section a further embodiment of distributor which is not rotary, but acts in a translation movement parallel to the interface of its members.
Figure 17:
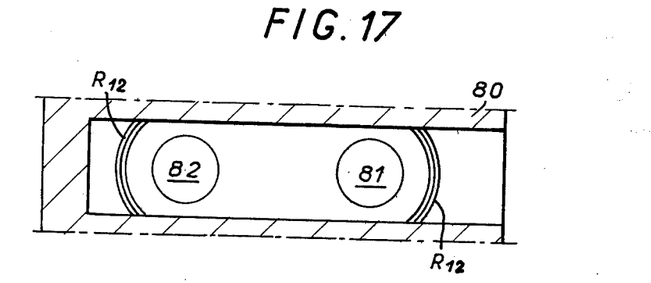
FIGS. 17, 18 and 19 are partial views along the line XVII—XVII, the line XVIII—XVIII and the line XIX—XIX of FIG. 16.
Figure 18:
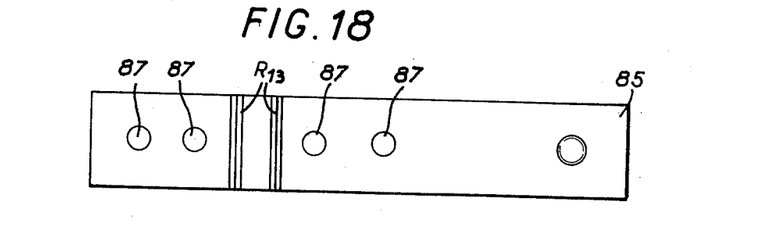
Figure 19:
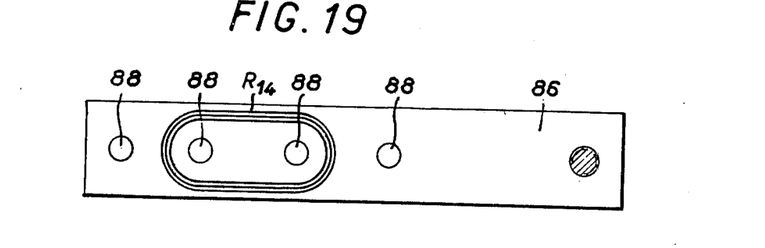

A planar sliding interface between the slide valve 85 and the body 80 is seen at 89, a planar sliding interface between the slide valves 85 and 86 is seen at 90 and a planar sliding interface between the slide valve 86 and the body 80 is seen at 91.

The passages 87 open on to the interfaces 89 and 90 and interact with the orifices 81 and 82, whilst the passages 88 open on to the interfaces 90 and 91 and interact with the orifices 83 and 84.

The passages 87 and 88 are designed to communicate with one another or to be isolated from one another, depending on the positions of the slide valves 85 and 86, in such a way that the pressure orifice 83 is put wholly or partly in communication, in the first active condition, with the operation orifice 81, the operation orifice 82 then communicating with the return orifice 84, or, in the second active condition which is the reverse of the preceding condition, with the operation orifice 82, the operation orifice 81 then communicating with the return orifice 84, or else, in the neutral open-centre condition, with the return orifice 84.

In order to minimise or even eliminate the thrusts generated by the fluid pressure perpendicular to the planar sliding interfaces 89, 90 and 91, at least one narrow groove is provided superficially in at least one of the members 80, 85 and 86 along at least one of the planar sliding interfaces 89, 90 and 91.

In the example illustrated in FIGS. 16 to 19, two such grooves $R_{12}$ (FIGS. 16 and 17) are made in the body 80 along the interface 89, two other such grooves $R_{13}$ (FIGS. 16 and 18) are made in the slide valve 85 along the interface 90, and another such groove $R_{14}$ (FIGS. 16 and 19) is made in the slide valve 86 along the interface 91.

I claim:

1. In a hydraulic distributor device comprising two adjacent members movable relative to one another along a planar sliding interface, said members having passages for the circulation of fluid under pressure, said passages opening on to said interface and being operable to communicate with one another or to be isolated from one another, depending on the relative position of said member; the improvement comprising at least one narrow groove provided superficially in at least one of said members along said interface, said groove having an open contour, both of the two ends of said groove opening either to the outer periphery or to the inner periphery of the member having said groove, all portions of said at least one groove communicating with regions of substantially the same pressure, so as to minimise or eliminate a thrust generated by the fluid pressure perpendicularly to said interface.

2. A hydraulic distributor device according to claim 1, wherein said members are operable to have a relative rotary movement about an axis perpendicular to said interface.

3. A hydraulic distributor device according to claim 1, wherein said groove has a width of the order of 1 mm and a depth of the order of ½ mm.

4. Power-assisted steering apparatus, comprising pilot means and deflecting means, said pilot means being operable to act upon the deflecting means, said pilot means comprising a transmission element in two parts operable to move relative to one another with limited angular play permitting an angular stagger between said parts under the action of said pilot means, and assistance means which, in response to such an angular stagger, are allowed to act upon the deflecting means in the same direction as the pilot means, said assistance means comprising a hydraulic unit having fluid-pressure means and a tank, a hydraulic actuator acting upon said deflecting means, and a hydraulic distributor device as claimed in claim 1 disposed between the unit and the actuator, said distributor device comprising an axial stack comprising of a first stator, a first rotor disc rotating integrally with one of the two parts of the transmission element, at least one second rotor disc rotating integrally with the other part of the transmission element, and a second stator, the rotor discs and/or the stators having hydraulic passages for the feeding and return of fluid between the actuator and the unit, said groove being provided in at least one of said rotors and stators.

* * * * *